United States Patent [19]

Ishii et al.

[11] 4,419,882
[45] Dec. 13, 1983

[54] LEAKAGE DETECTION METHOD USING HELIUM

[75] Inventors: Hiroshi Ishii; Kohji Seki, both of Tokyo; Hiroshi Morishita, Kawasaki; Toshiaki Yamazaki, Tokyo, all of Japan

[73] Assignee: Nihonsanso Kabushiki Kaisha, Japan

[21] Appl. No.: 325,435

[22] PCT Filed: Mar. 6, 1981

[86] PCT No.: PCT/JP81/00048
§ 371 Date: Nov. 10, 1981
§ 102(e) Date: Nov. 10, 1981

[87] PCT Pub. No.: WO81/02631
PCT Pub. Date: Sep. 17, 1981

[30] Foreign Application Priority Data

Mar. 10, 1980 [JP] Japan ................................. 55-29946

[51] Int. Cl.³ ............................................. G01M 3/20
[52] U.S. Cl. .................................................... 73/40.7
[58] Field of Search .................... 73/40.7, 19; 250/281

[56] References Cited

U.S. PATENT DOCUMENTS 3,867,631 2/1975 Briggs et al. ..................... 73/40.7 X

FOREIGN PATENT DOCUMENTS 2207598 6/1974 France ................................. 73/40.7

Primary Examiner—S. Clement Swisher
Assistant Examiner—Joseph W. Roskos
Attorney, Agent, or Firm—Kane, Dalsimer, Kane, Sullivan and Kurucz

[57] ABSTRACT

A means for detecting helium which has flowed into a system by substitution for air at a leaking location and mixed with the remaining gases, and after the helium gas permeates a helium permeable membrane as a sample gas so that the air component unnecessary for detection is suppressed, the helium gas enters the space of a mass spectrometer tube. That is, the membrane suppresses the permeation of the air component and selectively allows the helium component to pass therethrough, so that the helium component ratio in the space of the spectrometer tube is made larger than that in the sample gas. The helium partial pressure in the gas with thus increased helium component is determined by the mass spectrometer.

The change in the helium partial pressure in the spectrometer tube is produced depending on the substitution between the air component gases and the helium gas at the leak location. After the helium component is increased by the function of the membrane, the leakage and its amount may be more easily and accurately detected.

Further, a helium gas or gases having an appropriate helium concentration sealed under pressure in a system may be sucked in as a sample gas when leaking out through a leaking location and introduced into a membrane disposed at an appropriate position to the spectrometer tube, and then leakage in a system is detected by the foregoing method.

These systems are, for example, vacuum or high pressure tanks, pipings, etc.

10 Claims, 6 Drawing Figures

FIG.1
PRIOR ART
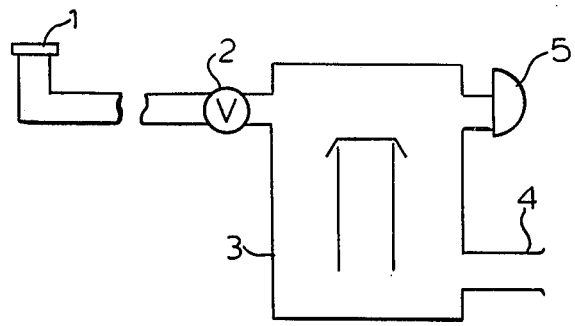
FIG.2
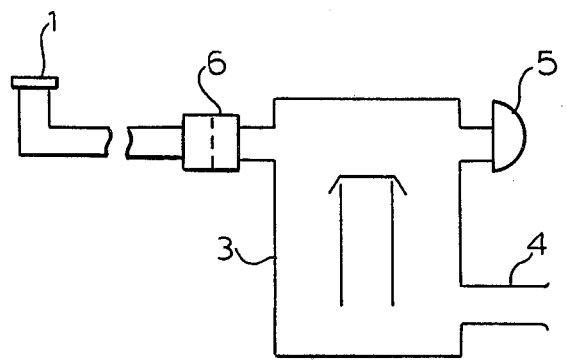
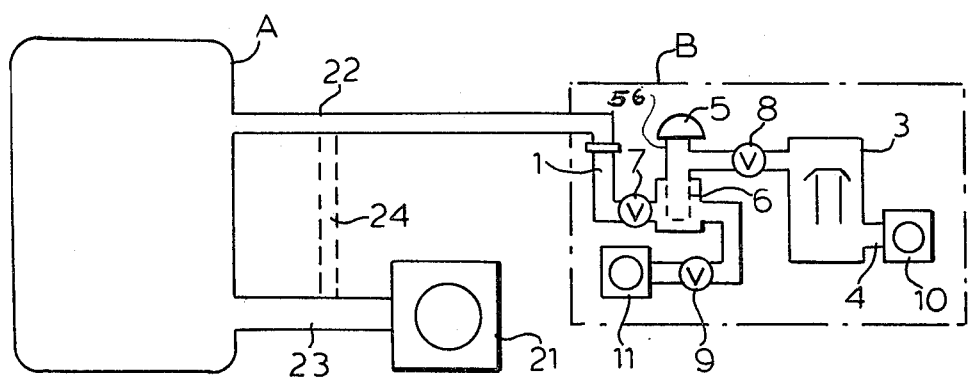
FIG.3

LEAKAGE DETECTION METHOD USING HELIUM

FIELD OF THE INVENTION

This invention relates to a method of detecting a leakage in a system by the use of a helium leak detector, particularly a method in which the partial pressure ratio of helium which reaches a detector tube (mass spectroscope tube) is increased by the use of a membrane which selectively allows helium gas to pass therethrough, thereby the leak detection sensitivity of the detector tube being increased and contamination and damage thereof being prevented.

BACKGROUND ART

Generally, helium leak detectors are often used for detecting a leaking location and the amount of leakage in systems or pipings which handle vacuum or high pressures. Leak detection by the use of the helium leak detector positively utilizes the fact that air contains a negligible, substantially constant amount of helium unless helium is artificially introduced therein. More specifically, this detection method includes generally two kinds of methods, the vacuum method and the pressure method. In the vacuum method, helium is blown against a portion of a test body (system) from the outside while the system is evacuated by a pumping system in the helium leak detector alone or together with a supplementary pumping system. If a leak exists, helium flows through that portion into the system by substitution for air in the system and the helium partial pressure in the remaining gases (in the system) increases, which increases the helium partial pressure in the detector tube and the increase is detected. In the pressure method, helium or helium diluted to an appropriate concentration is sealed under pressure in a system. The gases which are leaking through a leaking location out of the system are sucked in by a helium leak detector and are introduced into the detector tube. The introduced gases which are rich in helium component by an amount of helium gas which has been substituted in place of air component.

The conventional helium leak detector comprises, as shown in FIG. 1, generally a test port 1, a throttle valve 2, a diffusion pump 3, an exhaust pipe 4, a mass spectrometer tube 5, and a rotary pump (not shown).

Gases including helium (hereinafter referred to as sample gas) drawn in from a system or a Sniffer probe (Sniffer nozzle) flow into the test port 1 and are, if necessary, subjected to reduction in pressure by the throttle valve and thereafter are sucked by the diffusion pump 3 and exhausted from the exhaust pipe 4. The mass spectrometer tube 5 is provided in the space within the diffusion pump 3 on the side of the throttle valve 2 and the helium partial pressure in this space is determined.

The throttle valve 2 is provided for maintaining the partial pressure of the air component in the sample gas (the total pressure minus the helium partial pressure) not more than $10^{-4}$ Torr in the space of the mass spectrometer tube in order to prevent the filament of the spectrometer tube from burning out. The function of the valve is to variably reduce the total pressure because of its general nature and it has no selectively throttling function, and the partial pressure ratio (component ratio) between the air and the helium therefore remains constant at the upstream and downstream sides of the valve. For example, assume that the air partial pressure $P_1a$ applied to the test port 1 is constant and that the helium partial pressure $P_1h$ is as follows:

$$P_1 h = \begin{cases} 0 & t \leq 0 \\ \eta P_1 a & t > 0 \end{cases}$$

where t equals expired time after the helium flows into the test port 1, and where $\eta$ equals helium concentration, then the helium partial pressure $P_2h$ in the mass spectrometer tube 5 is $$P_2 h (t) = P_2 \cdot \eta \left\{ 1 - \exp\left( -\frac{S_v + C_v}{V} \cdot t \right) \right\} \quad (1)$$

where $P_2$ is the total pressure in the mass spectrometer tube 5, $C_v$ the conductance of the throttle valve 2, $S_v$ the effective pumping speed of the diffusion pump 3, V the volume of the space, including the space of the mass spectrometer tube 5, from the throttle valve 2 to the high vacuum side of the diffusion pump.

When considering the helium partial pressure $P_2h$ except the time depending factor, it is $P_2\eta$ Torr and depends on the total pressure in the mass spectrometer 5 when $\eta$ is made constant. To raise $P_2h$, $P_2$ must be made large, and a large $P_2$ necessarily increases the air partial pressure. However, in preventing the burnout of the filament of the spectrometer tube it is not desirable that the air partial pressure exceeds $10^{-4}$ Torr. $P_2h$ therefore must not exceed a maximum value of $10^{-4} \eta$ Torr. As a result, there is a disadvantage that leak detection is difficult when $\eta$ cannot be made large, for example, when the gas load is large by the degasing of a system or the like and the leakage is small.

Furthermore, the prior helium leak detector has disadvantages that the mass spectrometer tube 5 is connected through the throttle valve 2 alone to a system and is thus liable to be contaminated with dusts, fumes, etc. in the system, with deteriorated reliability, and the throttle valve is susceptible to clogging.

Accordingly, one object of the present invention is to provide a method of detecting a leakage in a system by the use of helium, in which the system leakage detectable range of the helium leak detector is enlarged by the use of a membrane which selectively allows helium to permeate. Another object of the invention is to suppress or control air component, dusts, and fumes which are unnecessary for detection of a leakage, by the provision of the membrane, so that the exhaust system of the leak detector and also the leak detector itself are made smaller in size and simultaneously contamination of the mass spectrometer is prevented to thereby improve the reliability of the leak detector.

DISCLOSURE OF THE INVENTION

The essential feature of the invention resides in that a membrane capable of selectively allowing helium gas to permeate it in comparison with air (which membrane is hereinafter referred to as helium permeable membrane), e.g., polystyrene membrane is used in helium leak detection.

Specifically, in the vacuum method the helium gas which has entered a system by substitution in place of air component is mixed with the remaining gases and passes as a sample gas through the helium permeable membrane which suppresses the air (mainly of $N_2$ and $O_2$) unnecessary for the detection. The helium gas at a vacuum level not more than $10^{-4}$ Torr in terms of the total pressure then enters the space in the spectrometer tube. The ratio of the helium component in the space of the spectrometer tube is made larger than that in the sample gas in proportion to the ratio of the product of permeability and the difference in partial pressure with respect to each gas. The helium partial pressure in the gas containing the increased helium component is determined by the mass spectrometer tube.

Briefly, the change in helium partial pressure in the spectrometer tube depends upon the amount of substitution of the helium gas for the air component gas at a leak location, and the helium component is increased by the function of the foregoing membrane, so that the presence and the amount of leakage are detected according to the increased helium gas component.

On the other hand, in the pressure method in which helium gas or helium gas having an appropriate concentration is sealed under pressure in a test body, a sample gas sucked in is led to the membrane placed at an appropriate position to the spectrometer tube, e.g., at the tip of a probe, and then leakage is, if any, detected according to the invention.

BRIEF DESCRIPTION OF THE DRAWINGS

FIG. 1 is a schematic illustration of the conventional helium leak detector.

FIG. 2 is a schematic illustration of the basic construction of a helium leak detector used in the present invention.

FIG. 3 is a connection diagram illustrating one embodiment in which a leakage in a system is detected by a helium leak detector during evacuation of the system by the use of a main pump.

BEST MODE OF CARRYING OUT THE INVENTION

Figure 4:
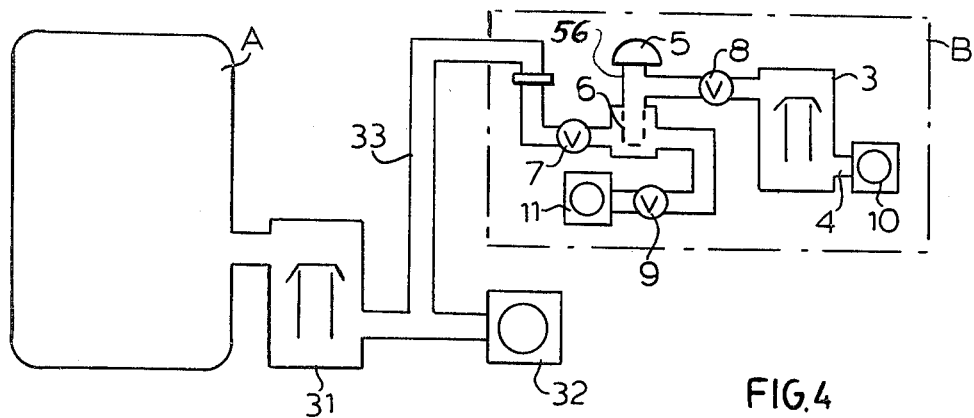
FIG. 4 is a connection diagram in which a back pressure method is adopted.

In FIG. 2 there is illustrated the basic construction of this invention in which a permeable membrane 6 is provided instead of the throttle valve 2 as shown in FIG. 1. Helium in a sample gas (a gas mixture containing air and a very small quantity of helium) is detected by a mass spectrometer tube 5 while being exhausted out of a diffusion pump 3 after passing through a permeable membrane 6. This membrane 6 maintains the partial pressure of the air in the mass spectrometer tube 5 at not more than $10^{-4}$ Torr as in the throttle valve 2 in FIG. 1. Further, the permeable membrane 6 selectively allows helium to permeate to thereby perform a role of raising helium concentration in the mass spectrometer tube 5.

When as in FIG. 1, the partial pressure of the air $P_1a$ applied to a test port 1 is constant and the partial pressure of the helium $P_1h$ is as follows:

$$P_1h = \begin{cases} 0 & t \leq 0 \\ \eta P_1a & t > 0 \end{cases}$$

and further when the total pressure in the mass spectrometer tube 5 is $10^{-4}$ Torr, the helium partial pressure $P_3h$ in the spectrometer 5 is $$P_3h(t) = 10^{-4}\eta \cdot \frac{C_h(S_m + C_a)}{C_a(S_m + C_h)} \times \left\{1 - \exp\left(-\frac{S_m + C_h}{V} \cdot t\right)\right\}, \quad (2)$$

where $C_h$ and $C_a$ are the conductances of the permeable membrane with respect to helium and air, respectively, $S_m$ effective pumping speed of the diffusion pump 3, and $V$ the volume of the space of the diffusion pump on the side of the permeable membrane 6. When $S_m > C_a$ and $S_m > C_h$, the equation (2) becomes as below.

$$P_3h(t) = 10^{-4}\eta \cdot \frac{C_h}{C_a} \times \left\{1 - \exp\left(-\frac{S_m}{V}t\right)\right\} \quad (3)$$

Accordingly, in the conventional helium leak detector and the one used in the present invention $S_v$ equals $S_m$ when all the conditions applied to them are the same except the difference in the throttle valve 2 and the permeable membrane 6. It will be understood that the permeation of the sample gas through the membrane 6 according to the present invention affords an increase in the helium partial pressure ratio by $C_h/C_a$ times compared to the case using the conventional throttle valve 2.

This invention is based on the above-mentioned fact, and can gives advantages that a leakage in a system can be detected on a relatively large difference in the helium partial pressure, and that the instrument for detecting the leakage can be made smaller in size. In addition, another advantage of preventing the mass spectrometer to be contaminated with dusts, fumes, etc. can be obtained.

FIGS. 3 through 6 show four illustrative embodiments of the invention.

In FIG. 3, there is shown a system A which is for example a tank, piping, etc. used for vacuum or high pressures, and a helium leak detector B which comprises a test port 1, diffusion pump 3, mass spectrometer tube 5, permeable membrane 6, throttle valves 7, 8 an 9, and rotary pumps 10 and 11. The system A is connected to the helium leak detector B and a main exhaust pump 21 through pipes 22 and 23, respectively. Alternatively, the main exhaust port of the system A can also be used as the detecting port by providing a pipe 24 as shown by the broken line. The main exhaust pump 21 is a vacuum pump such as rotary pump, and evacuates the system to a predetermined low vacuum level.

If there is a leaking portion in the system A, air flows into the system A through that portion, and the degree of vacuum in the system A becomes constant according to the pumping speed. Then, helium is blown against the outer walls of the system A. If the location against which the helium has been blown in leaking, the helium substitutes for the air at the location and enters the system A, with an increased helium partial pressure in the remaining gases in the system A. The remaining gases (sample gas) with the increased helium partial pressure flow through the pipes 22 or 24 into the test port 1 by exhaustion.

The sample gas which has flowed into the test port 1 is introduced through a throttle valve 7 and a permeable membrane 6 into the mass spectrometer tube 5. The sample gas after passing through the permeable membrane 6 is higher in the helium partial pressure ratio than that before passing through the membrane. The partial pressure ratio of the helium after passing through the membrane is detected in the mass spectrometer tube 5, and then it is exhausted through a throttle valve 8 by a diffusion pump 3 and a rotary pump 10. In this helium leak detector, the degree of vacuum in the mass spectrometer tube 5 is adjusted by the throttle valves 7 and 8. A rotary pump 11 is provided by substitution for the sample gas which is flowing into the permeable membrane 6 and a throttle valve 9 is incorporated for adjusting the effective exhaust speed of the pump 11.

As an alternative method, the rotary pump 10 may be also used as the rotary pump 11. In this case, the pipe downstream of the throttle valve 9 is connected to the pipe 4 which connects the diffusion pump 3 and the rotary pump 10. The rotary pump 11 can be replaced by other vacuum pumps or suction pumps according to the pressure of the sample gas flowing into the permeable membrane 6.

The embodiment as shown in FIG. 3 is effective as a detection method when leakage of a system is large, that is, the system cannot be maintained at a high degree of vacuum. In an example, when the interior of the system was at a pressure of $10^{-1}$ Torr, the helium within the system had a concentration of 100 PPM, and the mass spectrometer tube was at a pressure of $10^{-5}$ Torr, the helium partial pressure within the spectrometer tube was according to the prior method $10^{-9}$ Torr. On the other hand, in the helium leak detector shown in FIG. 3, with a permeable membrane having a helium conductance of $1 \times 10^{-4}$ l/s and an air conductance of $1.25 \times 10^{-6}$ l/s, the helium partial pressure was 14 times, after 1 second, and 50 times, after 5 second, as high as that of the prior method.

In FIG. 4, there is illustrated an alternative embodiment for detecting a leakage in a system, in which a sample gas in the system A is exhausted by a diffusion pump 31 and a rotary pump 32, and the diffusion pump 31 is connected at its back pressure side through a tube 33 to the helium leak detector B as shown in FIG. 3. This embodiment can perform effects similar to the embodiment in FIG. 3.

The present invention can also detect a leakage by sealing helium under pressure within a system.

Figure 5:
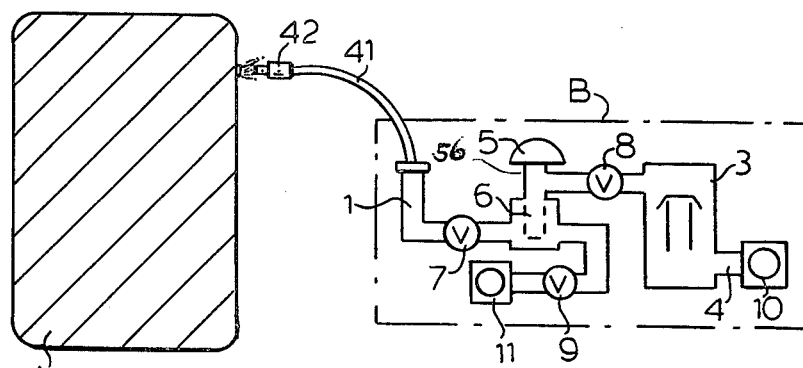
FIG. 5 is a connection diagram for detecting a leakage in a system by application of Sniffer method.

In FIG. 5, there is shown a method of detecting helium leaking out of the system A in which helium or gas mixture containing mainly helium is sealed under at least atmospheric pressure in the system (the oblique lines indicate a state under pressure), and a vacuum hose 41 is connected at one extremity to the test port 1 of the helium leak detector B and at the other extremity to a Sniffer nozzle 42 for detecting a helium leakage out of the system A. This method is an application of the conventional Sniffer method. Conventionally, Sniffer nozzles used in this method have had a disadvantage of being clogged with dusts and the like since the tips of the nozzles each have a very small through hole for keeping the pressure difference between atmospheric pressure and a high vacuum pressure in the helium leak detector.

On the other hand, according to the present invention, a relatively large through hole can be provided in the tip of the Sniffer nozzle, and thus the disadvantage of the hole being clogged with dusts and the like is eliminated and the detectability of the instrument can be greatly improved. In an example, the invention was put into practice according to the arrangement as shown in FIG. 5 with a permeable membrane having a helium conductance of $1 \times 10^{-6}$ l/s and an air conductance of $1.25 \times 10^{-8}$ l/s, on the conditions that after helium is sealed under pressure in a system, the mass spectrometer tube is kept at a high vacuum pressure of $10^5$ Torr. The helium partial pressure within the mass spectrometer tube was at a response time not more than 0.1 second about 80 times as high as that in the prior instrument. Instead of the Sniffer nozzle a sensor having a permeable membrane provided therein which selectively permits helium to permeate may be used. This sensor may have a hollow cylindrical shape with the tip end having recesses formed therein in a castellated manner and a permeable membrane provided in the interior of the cylinder.

Figure 6:
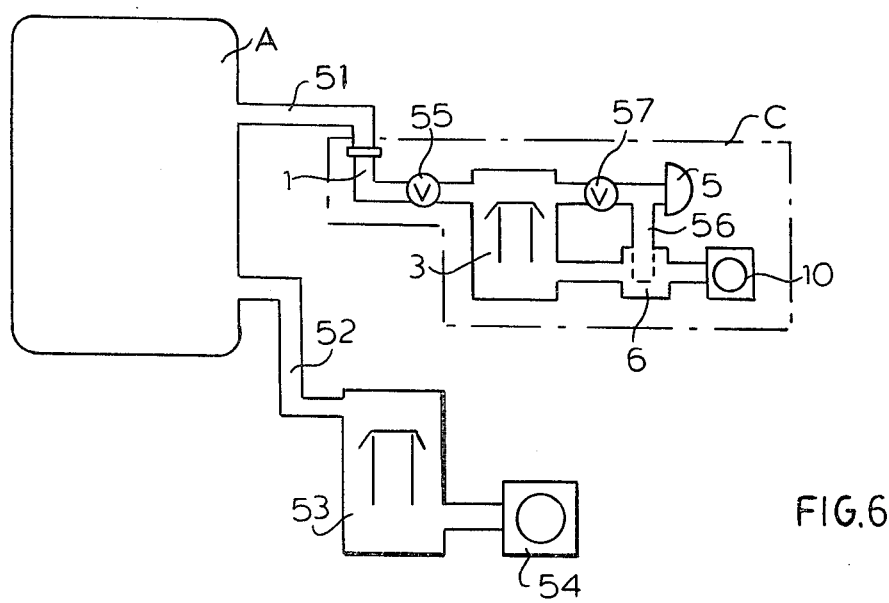
FIG. 6 is a connection diagram for detecting a leakage in a system at a high vacuum level.

Lastly, referring to FIG. 6, there is illustrated another embodiment of the present invention which is suitably applied to a case capable of maintaining a relatively high vacuum state. More specifically, this is a method in which exhaustion of the system A is made either by a helium leak detector c alone, through a tube 51 or by the leak detector along with another exhaust device comprising a diffusion pump 53 connected to the system through a tube 52 and a rotary pump 54.

A sample gas which has flowed through a test port 1 into the helium leak detector c is sucked through a throttle valve 55 in a diffusion pump 3, and is then exhausted by a rotary pump 10. Part of the sample gas between the diffusion pump 3 and the rotary pump 10 passes through a permeable membrane 6 to thereby raising the helium partial pressure. The gas having the raised helium partial pressure ratio flows through a branch circuit 56 and is sensed by a mass spectrometer tube 5. This gas passes through a throttle valve 57 and again sucked by the diffusion pump 3. The throttle valve 57 is to adjust the effective exhaust speed of the diffusion pump 3 in connection with the mass spectrometer tube.

As described above, the present invention has a feature that a sample gas is allowed to pass through a permeable membrane which permits selectively helium to pass therethrough in comparison with air and the helium partial pressure of the gas with a thus increased helium partial pressure ratio is detected by the mass spectrometer tube.

A permeable membrane having a relatively large separation coefficient with respect to helium and air (permeability to helium/permeabilty to air), and a permeability to helium of at least $10^{-4}$ l/s in terms of conductance is preferably used. Materials which can be easily formed into a thin film are preferably used for the permeable membrane. Macromolecular or high polymer films of such as polystyrenes are effective for meeting such requirements.

The functions and advantages achievable by the present invention are as follows. Since a helium partial pressure in a sample gas is raised by a permeable membrane and then detected by a mass spectrometer tube, the sensitivity of detection is thus greatly increased and the accuracy of detection is also improved. Furthermore, the reliability of the detector is improved since the interior of the mass spectrometer tube is always kept clean by the filtering effect of the permiable membrane. In addition, this invention can eliminate the disadvantages due to clogging with dusts and the like because the use of any throttle valve and Sniffer nozzle having very small capillary tubes is not needed.

The invention has further a large advantage of enabling the exhaust system provided in the helium leak detector to be made smaller in size. The conventional method needs a diffusion pump having an exhaust speed of 100 to 200 l/s and a rotary pump for exhausting the back pressure side of the diffusion pump, having an exhaust speed of 100 to 200 l/min. On the other hand, a helium leak detector to which the present invention is applied may be made much smaller in size because it can use a diffusion pump having a pumping speed of 1 l/s and a rotary pump of 1 l/min.

INDUSTRIAL APPLICABILITY

As described above, this invention is useful for detecting leakages in systems handling vacuum, e.g., tank, piping, etc., and may be used for detecting leakages in other airtight systems, e.g., high pressure tank, piping, etc.

What is claimed is:

1. A method of detecting a leakage in a system by the use of helium gas, comprising the steps of:
   supplying the helium gas to the system
   first drawing from the system sample gases at a low vacuum pressure which is created by a first vacuum pump, the sample gases including the supplied helium gas when the leakage exists in the system;
   throttling the flow of the drawn sample gases;
   increasing helium component in part of the throttled sample gases;
   detecting the increased helium component in the part of the sample gases; and
   exhausting the helium component increased sample gases so that the detecting step is made with the helium component increased sample gases being placed at a high vacuum pressure of at least $10^4$ Torr which is created by means of a second vacuum pump.

2. The method as recited in claim 1, wherein the helium component increasing step is made by means of a film composed of high polymers.

3. The method as recited in claim 2, wherein the film is composed of polystyrenes.

4. The method as recited in claim 2, further comprising the step of: providing a difusion pump to collect the sample gases from the system and to exhaust the collected sample gases to the first drawing step; and then collecting the sample gases from the system for passing to the first drawing step.

5. The method as recited in claim 2, wherein the drawing step further includes the step of collecting sample gases from the system through a Sniffer nozzle.

6. An apparatus for detecting helium in a system, which comprises:
   first vacuum means having a first conduit for drawing sample gases at a low vacuum pressure from said system;
   a mass spectrometer tube for detecting helium gas having a second conduit connected to the first conduit;
   a permeable membrane disposed in said second conduit so that any sample gases reaching the spectrometer tube must pass therethrough, the permeable membrane being more permeable to helium than at least one other gas, thereby increasing the proportion of helium in the sample gases contacting the mass spectrometer tube;
   a throttle valve, disposed in the first conduit upstream of the portion, connected to the second conduit, of the first conduit, for throttling the flow of the sample gases flowing therein; and
   second vacuum means connected to the second conduit, for creating a high vacuum in the second conduit downstream of the permeable membrane.

7. The apparatus recited in claim 6, further comprising:
   a first diffusion pump for collecting the sample gases from the system, the first diffusion pump having a third conduit connected to the first conduit for passing the collected sample gases to the first conduit; and
   third vacuum means, connected to the third conduit, for exhausting part of the sample gases collected by the first diffusion pump.

8. The apparatus recited in claim 6, wherein the first vacuum means includes a rotary pump, and the second vacuum means includes a second diffusion pump.

9. The apparatus recited in claim 8, wherein the second diffusion pump is disposed in the first conduit between the throttle valve and a portion, connected to the second conduit of the first conduit so that the sample gases are drawn through the throttle valve and exhausted by means of the second diffusion pump to the second conduit connected portion of the first conduit.

10. The apparatus recited in claim 6, further comprising a Sniffer nozzle connected to the first conduit upstream of the throttle valve.

* * * * *

UNITED STATES PATENT AND TRADEMARK OFFICE
CERTIFICATE OF CORRECTION

PATENT NO. : 4,419,882

DATED : December 13, 1983

INVENTOR(S) : Hiroshi Ishii et al

It is certified that error appears in the above-identified patent and that said Letters Patent is hereby corrected as shown below:

Column 6, line 9, "$10^5$" should be --$10^{-5}$--; and

Column 7, line 39, "$10^4$" should be --$10^{-4}$--.

Signed and Sealed this

Tenth Day of April 1984

[SEAL]

Attest:

GERALD J. MOSSINGHOFF

Attesting Officer

Commissioner of Patents and Trademarks